United States Patent
Schmidt et al.

(10) Patent No.: US 12,224,418 B2
(45) Date of Patent: Feb. 11, 2025

(54) ENERGY STORE INCLUDING A STORAGE MODULE ASSEMBLY WITH FANS

(71) Applicant: SEW-EURODRIVE GMBH & CO. KG, Bruchsal (DE)

(72) Inventors: Josef Schmidt, Graben-Neudorf (DE); Firat Altan, Karlsruhe (DE); Matthias Hauck, Schwetzingen (DE); Thomas Zöller, Bruchsal (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 476 days.

(21) Appl. No.: 17/762,798

(22) PCT Filed: Sep. 10, 2020

(86) PCT No.: PCT/EP2020/025404
§ 371 (c)(1),
(2) Date: Mar. 23, 2022

(87) PCT Pub. No.: WO2021/063539
PCT Pub. Date: Apr. 8, 2021

(65) Prior Publication Data
US 2022/0336888 A1    Oct. 20, 2022

(30) Foreign Application Priority Data
Oct. 2, 2019  (DE) .......................... 102019006874.2

(51) Int. Cl.
*H01M 10/6563*  (2014.01)
*H01M 10/613*  (2014.01)
(Continued)

(52) U.S. Cl.
CPC ..... *H01M 10/6563* (2015.04); *H01M 10/613* (2015.04); *H01M 10/6566* (2015.04);
(Continued)

(58) Field of Classification Search
CPC ........... H01M 10/613; H01M 10/6563; H01M 10/6565; H01M 10/6566; H01M 50/20; Y02E 60/10
See application file for complete search history.

(56) References Cited

U.S. PATENT DOCUMENTS

| 9,147,917 | B2 | 9/2015 | Ju et al. |
| 2015/0037632 | A1 | 2/2015 | Hiroyoshi et al. |

(Continued)

FOREIGN PATENT DOCUMENTS

| DE | 102012222754 A1 | 3/2014 |
| KR | 20120069274 A | 6/2012 |

OTHER PUBLICATIONS

International Search Report issued in corresponding International Application No. PCT/EP2020/025404 dated Nov. 30, 2020, pp. 1-2, English Translation.
(Continued)

*Primary Examiner* — Lingwen R Zeng
(74) *Attorney, Agent, or Firm* — Carter, DeLuca & Farrell LLP

(57) ABSTRACT

An energy store includes a storage module having a fan. The fan is arranged as a radial fan, and channels extend through the storage module, e.g., axially, open into a spatial region which is delimited by a cover part of the energy store connected to the storage module and the storage module. The cover part has a recess extending through the cover part, e.g., axially, which is covered by the fan, e.g., by the suction region of the fan, e.g., on the side of the cover part facing away from the storage module, and the energy store has a deflection hood, e.g., for deflecting the conveyed air flow in the axial direction, on the side of the cover part facing away from the storage module.

16 Claims, 6 Drawing Sheets

(51) Int. Cl.
  *H01M 10/6566* (2014.01)
  *H01M 10/6565* (2014.01)
  *H01M 50/20* (2021.01)

(52) U.S. Cl.
  CPC ........ *H01M 10/6565* (2015.04); *H01M 50/20* (2021.01); *Y02E 60/10* (2013.01)

(56) References Cited

U.S. PATENT DOCUMENTS

2016/0315364 A1* 10/2016 Smith .................. H01M 10/63
2018/0159188 A1   6/2018 Shizuka et al.

OTHER PUBLICATIONS

International Report on Patentability issued in corresponding International Application No. PCT/EP2020/025404 dated Apr. 5, 2022, pp. 1-7, English Translation.

* cited by examiner

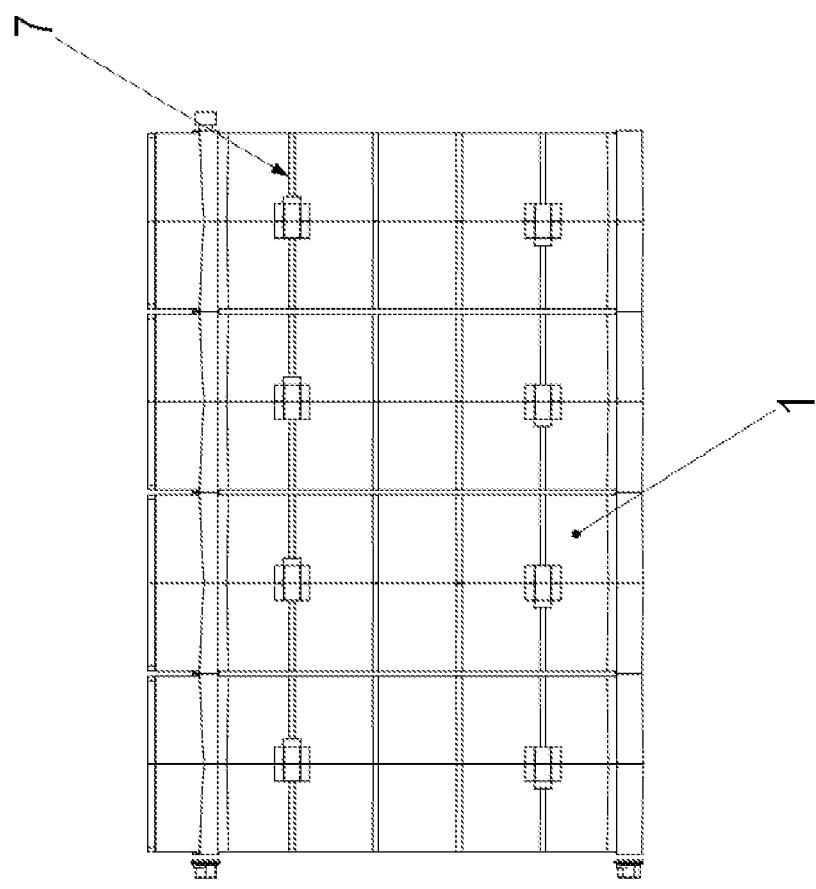
Fig. 4
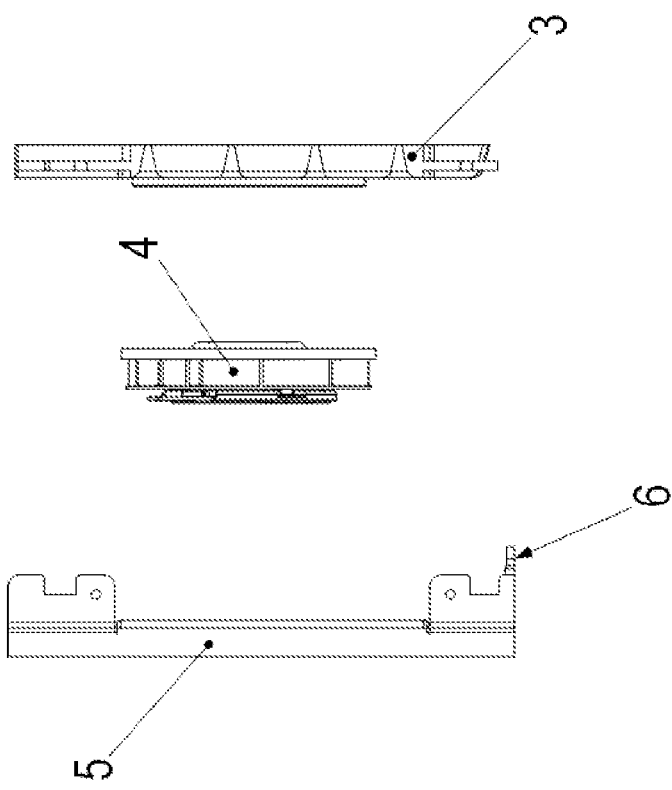

ENERGY STORE INCLUDING A STORAGE MODULE ASSEMBLY WITH FANS

FIELD OF THE INVENTION

The present invention relates to an energy store that includes a storage module having a fan.

BACKGROUND INFORMATION

In certain conventional systems, an energy store for storing electrical energy has a capacitor or accumulator.

An energy store is described in Korean Patent Document No. 10 2012 069 274.

A battery system is described in German Patent Document No. 10 2012 222 754.

A battery cooling system is described in U.S. Patent Application Publication No. 2015/0037632.

SUMMARY

Example embodiments of the present invention provide for a compact energy store.

According to an example embodiment of the present invention, an energy store includes a storage module having a fan arranged as a radial fan. Channels extending, e.g., axially, through the storage module open into a spatial region which is delimited by a cover part of the energy store connected to the storage module and the storage module. The cover part has a recess extending, e.g., axially, through the cover part, which is covered by the fan, e.g., by the suction region of the fan, e.g., on the side of the cover part facing away from the storage module. The energy store has a deflection hood, e.g., for deflecting the conveyed air flow in the axial direction, on the side of the cover part facing away from the storage module.

The advantage is that the energy store can be made compact. This is because the waste heat is efficiently dissipated. A fan is provided for actively conveying a cooling air flow, which absorbs the waste heat, on the one hand, from the interior of the energy store and, on the other hand, from the surface of the energy store. Cooling is thus provided. In this manner, the energy store can be operated with high discharge currents and charge currents, although the cells, e.g., accumulator cells or capacitor cells, such as ultracap, etc., are arranged touching one another and the energy store is thus made compact.

The configuration of the fan as a radial fan thus causes the conveyed air flow to be deflected from the axial suction direction to the radial exit direction. Thus, only a further deflection by a further 90° is necessary to deflect the conveyed air flow in the axial direction by the deflection hood and thus provides the conveyed air flow to flow along the outer surface of the energy store.

According to example embodiments, the air flow conveyed by the fan is deflected in the axial direction by the deflection hood, e.g., by an air baffle plate of the deflection hood, and flows along an outside of the storage module. The advantage is that the deflection hood only has to execute a deflection by 90° and thus only low losses are generated by the deflection.

According to example embodiments, the deflection hood is connected to the storage module and/or the cover part. The advantage is that fastening is readily executable.

According to example embodiments, the deflection hood protrudes laterally over the storage module, so that the air flow emerging between the storage module and the deflection hood, e.g., the air baffle plate of the deflection hood, emerges in the axial direction. The advantage is that the energy store can be placed on a floor surface and, nonetheless, the deflection hood creates spacing between the storage module and the floor surface, through which the air flow emerging from the outlet opening flows. The cooling of the energy store can thus be reliably achieved.

According to example embodiments, the channels are spaced apart from one another and/or extend in parallel to each other. It is considered advantageous that the interior of the energy store can be evenly cooled.

According to example embodiments, the air flow emerging from the fan flows into a second spatial region which is delimited by the deflection hood and the cover part, in which an outlet opening is provided between the deflection hood and the storage module, e.g., for the emergence of the conveyed air flow from the second spatial region into the surroundings. It is considered advantageous that the air flow emerging from the fan can be calmed in the spatial region delimited by the deflection hood together with the cover part and there is thus a uniform outflow from the spatial region into the surroundings at the outlet opening, e.g., along the outer surface of the energy storage.

According to example embodiments, the air flow conveyed by the fan flows through the channels in the opposite direction to the through-flow direction of the outlet opening. The advantage is that efficient cooling can thus be achieved, e.g., from the inner region and additionally also from the outer surface.

According to example embodiments, the axis of rotation of the fan is aligned in parallel to the axial direction. It is considered advantageous that air can be suctioned in axially by the fan, which is arranged as a radial fan, so that the air flow does not have to be deflected in the suction region.

According to example embodiments, the deflection hood is made as a stamped-bent part from sheet metal and the air baffle plate is an angled region of the deflection hood. The advantage is that deflection of the air flow conveyed by the fan is implementable in a simple manner.

According to example embodiments, the fan has an outlet opening for the air flow emerging from it, e.g., through which the air flow conveyed by the fan exits radially, in which the circumferential angular range overlapped by the outlet opening overlaps or includes the circumferential angular range covered by the outlet opening. It is considered advantageous that the air flow emerging radially from the fan does not emerge over the entire circumference of the fan, but only at one point on the circumference which directs the air flow emerging from the fan onto the outlet opening. A lossy deflection of the air flow is therefore not necessary.

According to example embodiments, the clear diameter of each of the channels is periodically variable in the axial direction within the storage module, e.g., in which the storage module has modules arranged in succession in the axial direction, and the clear diameter in each case has its maximum value in the connecting region of two respective modules. The advantage is that the air flow does not flow through the channels in a laminar manner, but rather has turbulent flow, so that an improved heat transfer from the storage module to the air flow is achievable.

Further features and aspects of example embodiments of the present invention are explained in more detail with reference to the appended schematic Figures.

BRIEF DESCRIPTION OF THE DRAWINGS

FIG. 4 is an exploded side view of the energy store.

DETAILED DESCRIPTION

Figure 1:
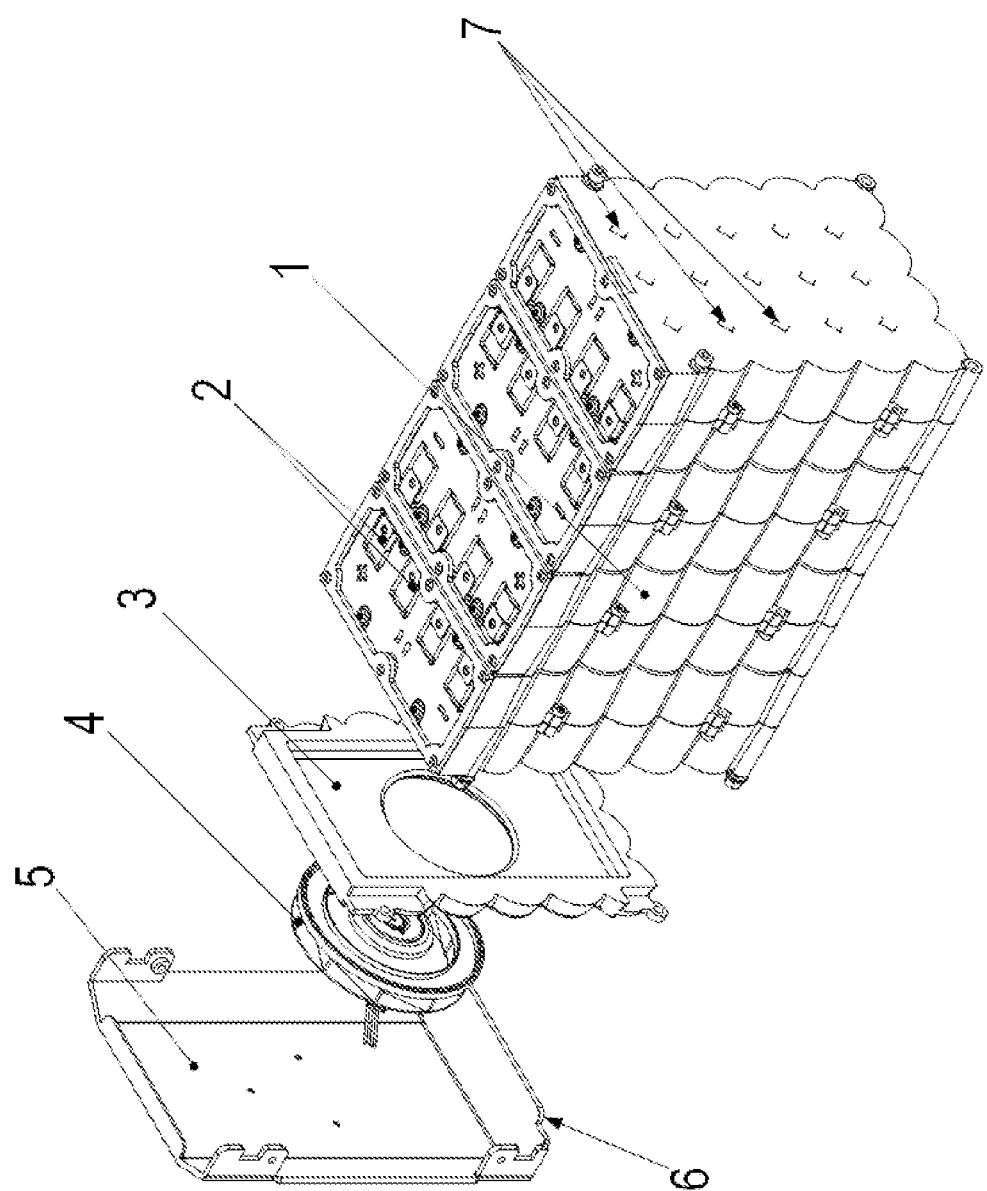
FIG. 1 is an exploded view of an energy store.
Figure 2:
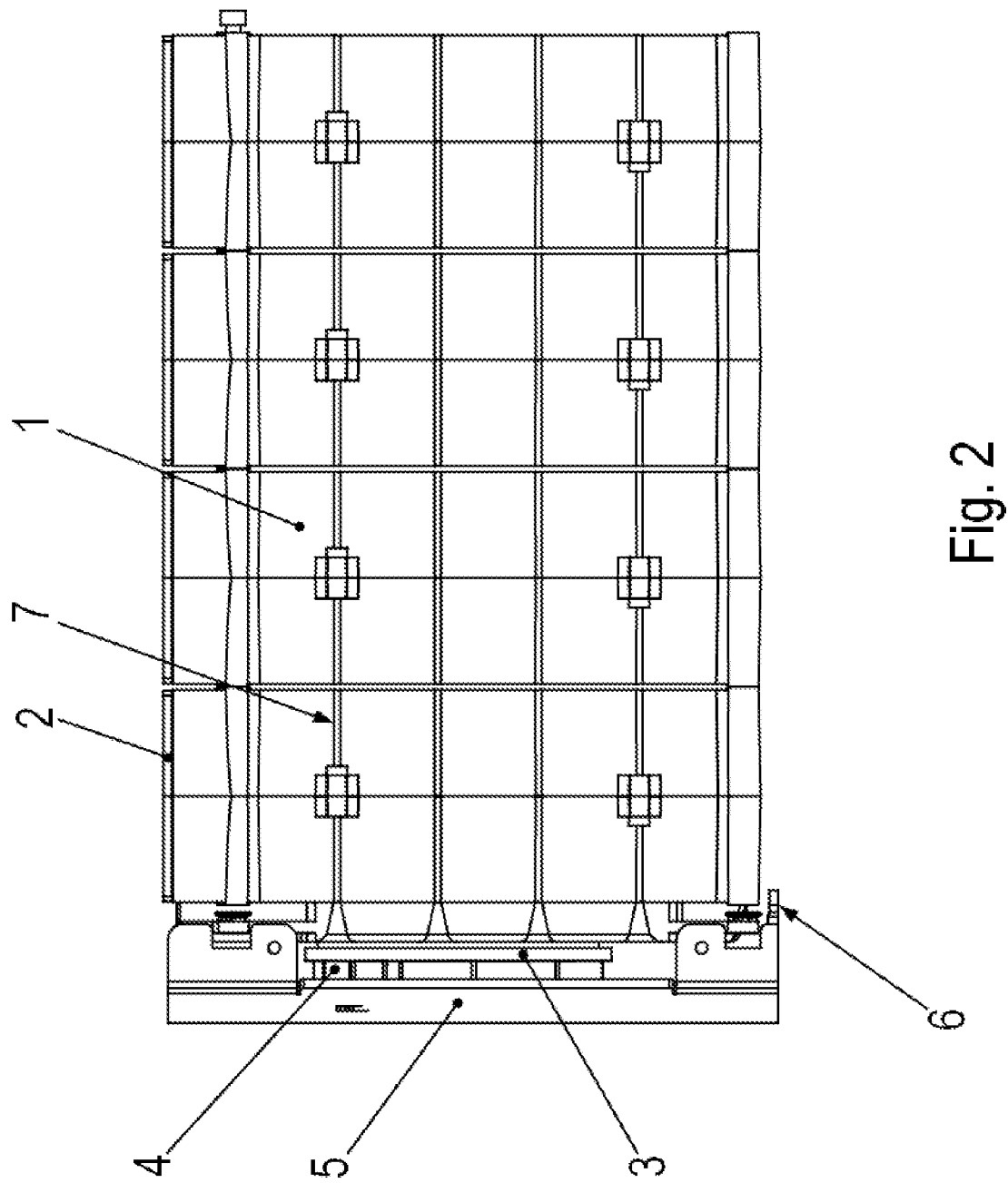
FIG. 2 is a side view of the energy store.
Figure 3:
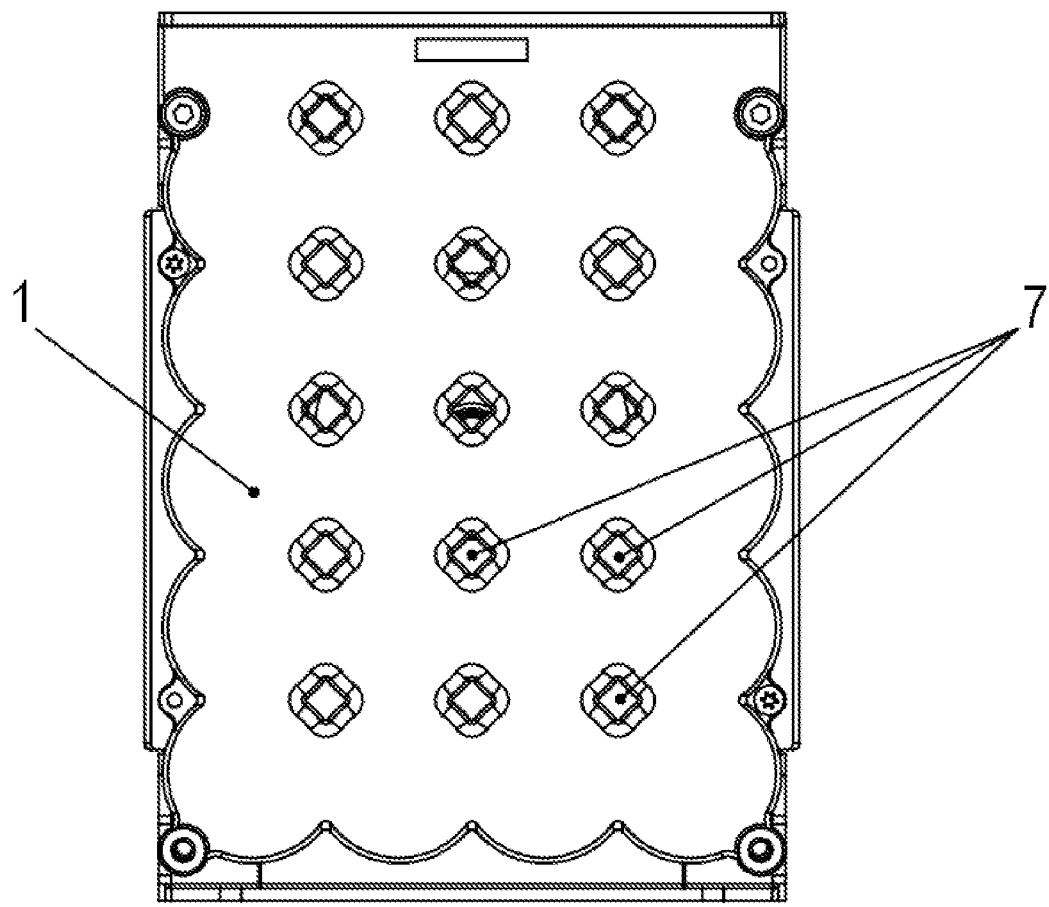
FIG. 3 is a top view of the storage module.
Figure 5:
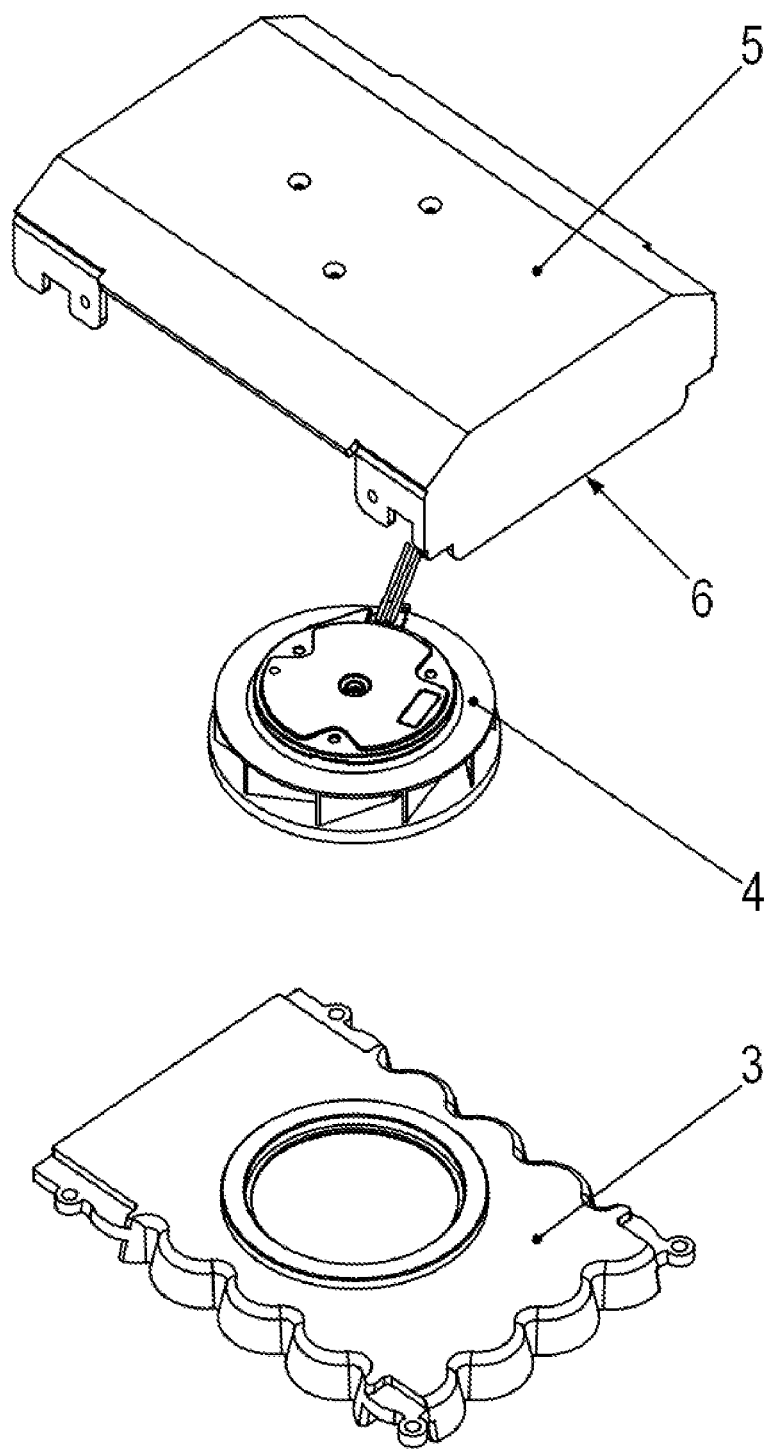
FIG. 5 is an enlarged perspective view of individual parts of the energy store illustrated in FIG. 1.
Figure 6:
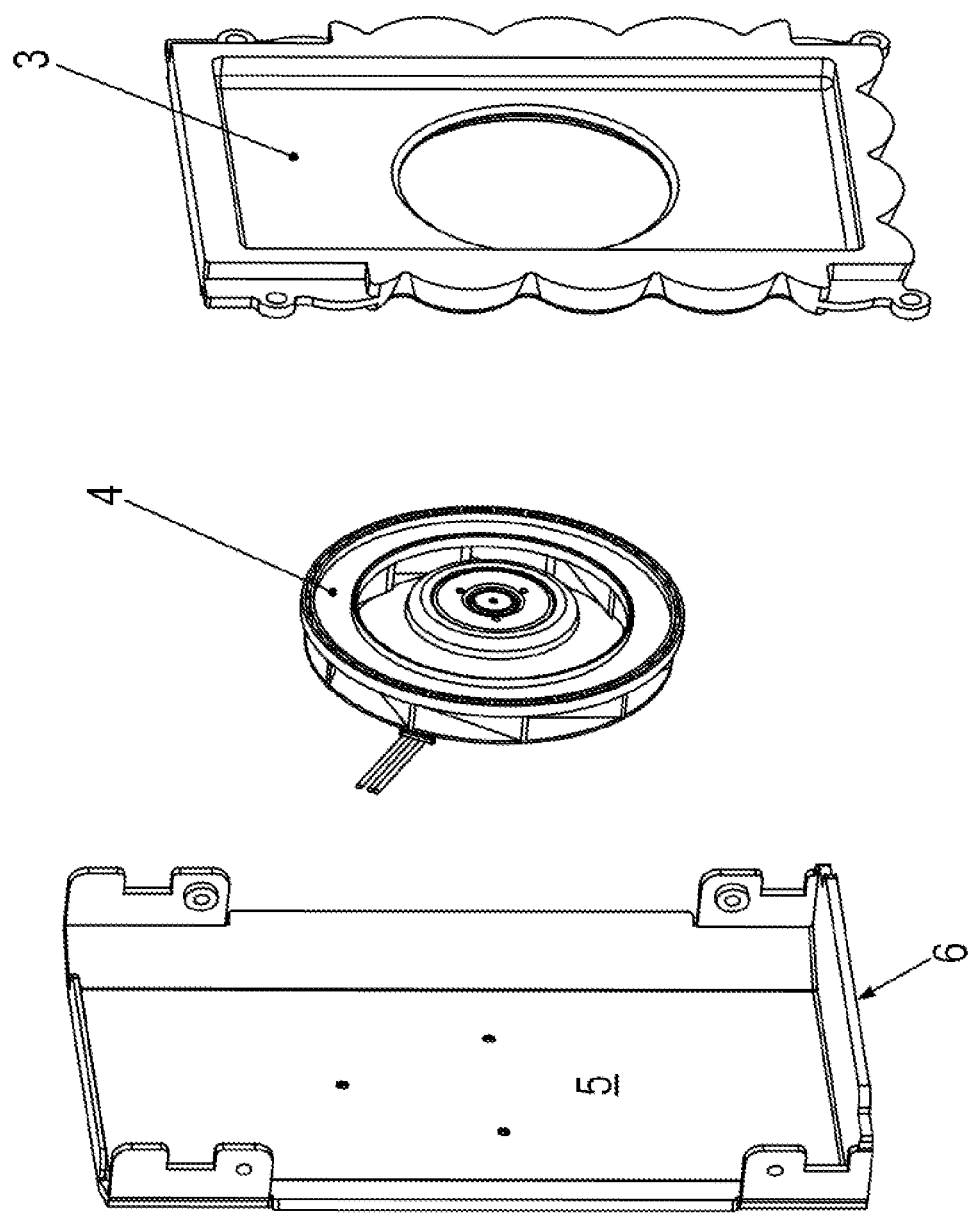
FIG. 6 is another enlarged perspective view of the individual parts of the energy store illustrated in FIG. 1.

As shown in the Figures, an energy store according to an example embodiment of the present invention has a storage module 1. This has regularly arranged cells, e.g., double-layer capacitors, such as ultracaps, and/or accumulator cells, which are electrically interconnected with one another. For this purpose, series circuits, for example, are formed from cells which are interconnected with one another in parallel. A desired voltage can thus be provided.

The connections 2 are arranged on the upper side of the energy store.

A radial fan 4 is provided for conveying a cooling air flow which flows through the energy store and thus cools it. For this purpose, channels which are axially continuous, spaced apart from one another, and aligned in parallel to one another are provided in the storage module 1, through which the air flow conveyed by the radial fan 4 is guided.

On its end face facing toward the radial fan 4, a cover part 3 is placed on the storage module 1 and is connected to the storage module 1 in a tight, e.g., airtight manner. For this purpose, the cover part 3 has a depression into which the channels open. The end face of the storage module 1 is placed against the cover part 3. A circumferential projection, e.g., a bead, formed on the outer edge of the cover part 3 contacts the storage module 1 and seals it such that the conveyed air flow does not emerge laterally, e.g., at the edge, and/or does not emerge at the contact region between cover part 3 and storage module 1.

Since the storage module 1 includes, for example, cylindrical cells, the edge of the cover part 3, e.g., on its side facing toward the storage module 1, has indentations, e.g., radially outwardly directed depressions, each of which corresponds to a cylinder segment. The edge of the cover part 3 is thus shaped in accordance with the outer course of the end face of the storage module 1.

The cover part 3 additionally has an axially continuous, e.g., circular, recess through which the air flow conveyed by the radial fan 4 flows. The clear diameter of the recess is larger than the diameter of the suction region of the radial fan 4, e.g., larger than the inner diameter of the air flow which enters the radial fan 4, and is suctioned in and thus conveyed by the radial fan 4.

The housing of the radial fan 4 arranged on the side of the cover part 3 facing away from the storage module 1 is connected to the cover part 3 in a tight, e.g., airtight manner. On the other side, e.g., on the side of the radial fan 4 facing away from the storage module 1 and/or from the cover part 3, a deflection hood 5 is arranged.

The radial fan 4 is thus arranged, e.g., axially, between the deflection plate 5 and the cover part 3.

The deflection hood 5 is provided for deflecting the air flow, which is directed and/or conveyed radially outward by the radial fan 4. In this case, the air flow actually conveyed radially outward by the radial fan 4 is deflected in the axial direction, e.g., in the direction opposite to the air flow suctioned in by the radial fan impeller 4.

For this purpose, an air baffle plate 6 is provided on the deflection hood 5 or a correspondingly shaped region is formed on the deflection hood 6. In the following description, an air baffle plate 6 is referred to in each case. This can thus be formed integrally, e.g., in one part, or alternatively in two parts, e.g., two pieces, on or with the deflection hood 5.

In this case, the air flow conveyed radially outward by the radial fan 4 is deflected in the axial direction by the air baffle plate 6 or by the correspondingly shaped region.

In this manner, this deflected air flow can wash below the lower side of the storage module 1.

Thus, the air flow conveyed through the channels is collected in the depression of the cover part 3 and from there guided through the axially continuous recess of the cover part to the suction region of the radial fan 4. By deflecting the air flow emerging from the radial fan 4 by the deflection hood 5, the deflected air flow flows along the lower side of the storage module 1. Thus, cooling takes place not only inside the storage module 1, but also on the outside.

The storage module 1 has modules arranged in succession in the axial direction. Thus, depending on the energy storage capacity, a corresponding number of modules are arrangeable in series and connectable to one another.

For example, the axial direction is thus parallel to the longitudinal axis of the storage module.

The clear diameter of each of the channels in the axial direction within the storage module is periodically variable, and the clear diameter in each case has its maximum value in the connecting region of two respective modules. This means that the channel is narrowest in each case in the middle of the respective module.

Each of the modules has a housing part in which cells are received. The cells are each shaped cylindrically so that the receiving region of the respective housing part has corresponding inner cylindrical regions. Each cell is arranged either as a capacitor, e.g., a double-layer capacitor, or as an accumulator cell. The housing parts of two respectively adjacent modules of the memory module 1 are detachably connected to one another by a screw. The cells are electrically interconnected with one another.

In further exemplary embodiments according to the present invention, further air baffle plates are arranged as deflection regions on the deflection hood 5, so that the deflected air flow also flows along other sides of the storage module 1.

LIST OF REFERENCE NUMERALS

1 memory module
2 connection
3 cover part
4 radial fan
5 deflection hood
6 air baffle plate
7 channel, e.g., axially continuous

The invention claimed is:

1. An energy store, comprising:
   a storage module;
   a cover part connected to the storage module;
   a deflection hood arranged on a side of the cover part facing away from the storage module; and
   a radial fan;
   wherein channels extending through the storage module open into a spatial region delimited by the cover part and the storage module;
   wherein a recess extends through the cover part and is covered by the fan; and
   wherein a clear diameter of each of the channels varies periodically in an axial direction within the storage module.

2. The energy store according to claim 1, wherein the channels extend axially through the storage module, the recess extends axially through the cover part, the recess is covered by a suction region of the fan on a side of the cover part facing away from the storage module, the deflection hood is adapted to deflect a conveyed air flow in an axial direction that is parallel to a longitudinal axis of the storage module.

3. The energy store according to claim 1, wherein the deflection hood is adapted to deflect an air flow, conveyed by the fan, in an axial direction to flow along an outside of the storage module.

4. The energy store according to claim 1, wherein an air baffle plate of the deflection hood is adapted to deflect an air flow, conveyed by the fan, in an axial direction to flow along an outside of the storage module.

5. The energy store according to claim 1, wherein the deflection hood is connected to the storage module and/or the cover part.

6. The energy store according to claim 1, wherein the deflection hood protrudes laterally over the storage module, so that air flow emerging between the storage module and the deflection hood exits in the axial direction.

7. The energy store according to claim 1, wherein the deflection hood protrudes laterally over the storage module, so that air flow emerging between the storage module and an air baffle plate of the deflection hood exits in the axial direction.

8. The energy store according to claim 1, wherein the channels are spaced apart from one another and/or extend in parallel to each other.

9. The energy store according to claim 1, wherein an air flow exiting from the fan flows into a second spatial region delimited by the deflection hood and the cover part, and an outlet opening is provided between the deflection hood and the storage module.

10. The energy store according to claim 1, wherein an air flow exiting from the fan flows into a second spatial region delimited by the deflection hood and the cover part, and an outlet opening is provided between the deflection hood and the storage module to exit conveyed air flow from the second spatial region into the surroundings.

11. The energy store according to claim 9, wherein an air flow conveyed by the fan flows through the channels in an opposite direction to a through-flow direction of the outlet opening.

12. The energy store according to claim 1, wherein an axis of rotation of the fan is aligned in parallel to an axial direction of the energy store.

13. The energy store according to claim 1, wherein the deflection hood is arranged as a stamped-bent, sheet metal part and an air baffle of the deflection hood plate is arranged an angled region of the deflection hood.

14. The energy store according to claim 1, wherein the fan includes an outlet opening for an emerging air flow, and a circumferential angular range overlapped by the outlet opening overlaps and/or includes a circumferential angular range covered by the outlet opening.

15. The energy store according to claim 1, wherein the fan includes an outlet opening for an emerging air flow through which the air flow conveyed by the fan exits radially, and a circumferential angular range overlapped by the outlet opening overlaps and/or includes a circumferential angular range covered by the outlet opening.

16. The energy store according to claim 1, wherein the storage module includes modules arranged in succession in the axial direction, and the clear diameter of each channel has a maximum value in a connecting region of two respective modules.

* * * * *